United States Patent

[11] 3,607,051

[72] Inventors Jaromir Plesek
Prague;
Stanislav Hermanek, Prague; Jaroslav Vit, Prague; Jaroslav Lohnisky, Usti nad labem; Karel Vrba, Usti nad labem, all of Czechoslovakia
[21] Appl. No. 871,524
[22] Filed Nov. 7, 1969
[45] Patented Sept. 21, 1971
[73] Assignee Ceskoslovenska akademie ved
Prague, Czechoslovakia
Continuation of application Ser. No. 433,168, Feb. 16, 1965, now abandoned.

[54] PREPARATION OF A FORMED BODY OF SODIUM HYDROXIDE AND SODIUM HYDRIDE
5 Claims, No Drawings
[52] U.S. Cl. .................................................... 23/204
[51] Int. Cl. .................................................... C01b 6/04
[50] Field of Search ...................................... 23/204

[56] References Cited
UNITED STATES PATENTS
2,513,997   7/1958   Gibb ............................. 252/188
FOREIGN PATENTS
931,221   8/1955   Germany .................... 23/204
139,651   1961   U.S.S.R. ......................... 23/204

*Primary Examiner*—Oscar R. Vertiz
*Assistant Examiner*—G. O. Peters
*Attorney*—Michael S. Striker

ABSTRACT: A shape-retaining solid body consisting essentially of an intimate heterogeneous mixture of between about 10 percent and 90 percent by weight of subdivided solid sodium hydride and between 90 percent and 10 percent by weight of subdivided solid sodium hydroxide is produced by forming an intimate mixture, preferably at a temperature of between −10° and 50° C. of between about 10 percent and 90 percent by weight of subdivided solid sodium hydride and between about 90 percent and 10 percent by weight of subdivided solid sodium hydroxide, and compressing the thus-formed mixture at a sufficiently high pressure, preferably between about 100 and 250 kg./cm² so as to convert the mixture into a shape-retaining body.

PREPARATION OF A FORMED BODY OF SODIUM HYDROXIDE AND SODIUM HYDRIDE

This application is a streamline continuation of Ser. No. 433,168, now abandoned.

The subject matter of the invention is a preparation on the basis of sodium hydride for industrial purpose and a method for its manufacture.

Until the present time, the easy inflammability of sodium hydride in a moist medium containing oxygen, for example in moist air, has been an obstacle to a more extensive use of this chemical. For the same reason, extensive safety precautions have been introduced as for example a ban on the transportation of pure sodium hydride by mail. However, in a number of industrial branches pure sodium hydride is not necessary and so, for the use in similar productions, sodium hydride was modified, for example by mixing with some hydrophobic substances such as oils. The sodium hydride thus treated could safely be transported, but, on the other hand, it could not be used in those cases which involved higher temperatures at which evaporation or cracking of oil take place and the products of oil decomposition depreciate the final product in various ways.

The above disadvantages are obviated by the present invention. Its subject matter is a preparation on the basis of sodium hydride for industrial purposes for example to be added to pickling baths, safe against self-ignition, which is composed of 10 to 90 percent by weight of sodium hydride and 90 to 10 percent by weight of sodium hydroxide. The preparation is manufactured by first mixing sodium hydride with sodium hydroxide at a temperature of between $-10°$ to $50°$ C., whereupon the mixture is hardened, for example by compressing.

The invention is based on the observation that after compressing of sodium hydride with sodium hydroxide to the form of such pieces as for example briquettes, inflammation does not take place in contact with a medium containing moisture and oxygen, because of a considerable reduction of the active surface area of the mixture. Contrary to powdered sodium hydride or pressed sodium hydride, the product obtained according to this invention dissolves excellently in molten sodium hydroxide and no special device is needed to introduce it into the bath.

Another advantage of the invention is the fact that the sodium hydride thus treated is also substantially more suitable for transport, for instance by rail, than pure powdered sodium hydride. A significant success is also a substantial increase in the specific weight of sodium hydride which in the original powdered condition has a bulk weight of 0.3 to 0.35 g./cm.$^3$, whereas sodium hydride treated according to the invention in the form of a 50 percent by weight mixture has a specific weight of 1.3 to 1.4 g./cm.$^3$. The technical and economic consequence of this treatment of sodium hydride is a saving of storage accommodation of up to 50 percent. Another advantage is a good wettability of sodium hydride due to sodium hydroxide, which quality successfully manifest itself in all cases in which sodium hydride is to be introduced into an inorganic melt.

When employing the subject matter of the invention, a mixture of the two components, namely sodium hydride and sodium hydroxide, is crushed in a protective gaseous medium, for example in argon or nitrogen, or the two components are crushed each separately, whereupon they are mixed and hardened, for example by compressing, to a required shape.

EXAMPLES OF PROCEDURE

1. A mixture of 5 kg. of powdered sodium hydride and 5 kg. of crushed sodium hydroxide was well mixed at a working temperature of approx. 20° C., whereupon it was compressed on a hydraulic press at a pressure of 100 kp./cm.$^2$ to cylindrical briquettes of a diameter of 55 mm. and a height of 36.5 mm. in all, 91 briquettes of an average weight of 107 g. were obtained. The specific weight of the briquettes was 1.23 g./cm.$^3$, the briquettes were strong and stable in the air.

2. A mixture of 9 kg. of powdered sodium hydride and 1 kg. of crushed sodium hydroxide was compressed at a working temperature of 0° C. on a hydraulic press at the pressure of 250 kp./cm.$^2$ to cylindrical briquettes of a diameter of 55 mm. and a height of 19.8 mm. In all, 195 briquettes of an average weight of 50 g. and a specific weight of 1.06 g./cm.$^3$ were made. The briquettes were strong and in a moist air got spontaneously coated with a protective layer of sodium hydroxide.

3. A mixture of 3.33 kg. of powdered sodium hydride and 6.67 kg. of crushed sodium hydroxide was mixed at an ambient temperature of 10° C. Compressed on a hydraulic press with a pressure of 250 kp./cm.$^2$ to cylindrical briquettes of a diameter of 55 mm. and a height of 27.9 mm. 104 briquettes of an average weight of 95 g. were obtained. The briquettes were perfectly strong and stable in the air. Their specific weight was 1.45 g./cm.$^3$.

The subject matter of the invention may suitably be used in all cases where so far the presence of oil admixtures has interferred, i.e. in the pickling of metal surfaces, in the manufacture of powdered metals, in the activation of metal surfaces and in all cases where a strong reducing effect at elevated temperatures in an alkaline medium is required. Ir may further be used with advantage in such cases where the inflammability and self-ignition of pure powdered-sodium hydride, or a poor solubility of pressed sodium hydride, were serious obstacles.

What we claim is:

1. A method of producing a shape-retaining body consisting essentially of sodium hydride and sodium hydroxide, the said method comprising the steps of intimately mixing between about 10 and 90 percent by weight of a preformed powdered solid sodium hydride and between about 90 and 10 percent by weight of a comminuted solid sodium hydroxide; and compressing said mixture at a pressure of up to 250 kg./cm.$^2$.

2. A method as defined in claim 1, wherein said mixture is formed at a temperature of between $-10°$ C. and $+50°$ C.

3. A method as defined in claim 1, wherein said mixture is formed of substantially equal proportions of sodium hydride and sodium hydroxide.

4. A method as defined in claim 1, wherein the proportion of sodium hydride and sodium hydroxide and the compression pressure is adjusted to obtain a compacted body having a specific weight between about 1.06 and 1.45 grams per cubic centimeter.

5. A method as defined in claim 1, wherein said compressing is carried out at a pressure of about 100 kg./cm.$^2$.